(12) United States Patent
Russell et al.

(10) Patent No.: US 6,267,070 B1
(45) Date of Patent: Jul. 31, 2001

(54) SYSTEM FOR TOWING EQUIPMENT AT SEA

(75) Inventors: Michael John Russell, New Milton (GB); Erik Godøy, Bødalen (NO)

(73) Assignee: Petroleum Geo-Services AS, Lysaker (NO)

( * ) Notice: Subject to any disclaimer, the term of this patent is extended or adjusted under 35 U.S.C. 154(b) by 0 days.

(21) Appl. No.: 09/322,385

(22) Filed: May 28, 1999

(30) Foreign Application Priority Data

Dec. 6, 1996 (NO) .................................................. 96.5215
Nov. 17, 1997 (WO) .................................. PCT/NO97/00304

(51) Int. Cl.[7] .................................................. B63B 21/66
(52) U.S. Cl. ............................................ 114/244; 114/246
(58) Field of Search ................................. 114/242, 244, 114/245, 253, 162; 367/16

(56) References Cited

U.S. PATENT DOCUMENTS

| 3,404,655 | 10/1968 | Fohl . |
| 4,535,714 | 8/1985 | Petersen . |
| 4,890,568 | 1/1990 | Dolengowski . |
| 5,913,280 | * 6/1999 | Nielsen et al. .................. 114/242 |

FOREIGN PATENT DOCUMENTS

| 0562780 A1 | 9/1993 | (EP) . |
| 1382653 | 2/1975 | (GB) . |
| 174616 | 8/1994 | (NO) . |
| PCT/FR93/00255 | 9/1993 | (WO) . |

* cited by examiner

*Primary Examiner*—Ed Swinehart
(74) *Attorney, Agent, or Firm*—Arnold & Associates

(57) ABSTRACT

A system for towing equipment at sea comprises a main vessel adapted to tow the equipment in a given direction of movement. At least one active deflector is disposed behind and on each side of the main vessel for pulling at least part of the towed equipment transversely in relation to the direction of movement of the main vessel. At least one support vessel is connected to each deflector for assisting the deflector in pulling at least part of the towed equipment transversely in relation to the direction of movement of the main vessel, and for assisting the main vessel by providing additional towing force to the towed equipment. The additional towing force provided by the support vessel is essentially parallel in direction to the force provided by the main vessel. A cable connects each support vessel to the associated active deflector for supplying one or more of power and control signals from the support vessel to the associated deflector. At least one wing is attached to each deflector. A rotatable cylinder is attached to the deflector adjacent the front edge of at least one wing. A drive unit is associated with the cylinder for rotating the cylinder for imparting to the deflector additional lift outward from the towing vessel.

19 Claims, 2 Drawing Sheets

SYSTEM FOR TOWING EQUIPMENT AT SEA

CROSS-REFERENCE TO RELATED APPLICATIONS

This application claims foreign priority benefits to Norway patent appl. no. 96.5215, filed Dec. 6, 1996, and to PCT patent appl. No. PCT/NO97/00304, filed Nov. 17, 1997.

STATEMENT AS TO RIGHTS TO INVENTIONS MADE UNDER FEDERALLY-SPONSORED RESEARCH AND DEVELOPMENT

Not applicable.

BACKGROUND OF THE INVENTION

1. Field of the Invention

This invention relates to a system for towing equipment at sea, especially in seismic surveys, comprising a main vessel adapted to tow the equipment in a chosen direction of movement, at least one deflector on each side of the main vessel adapted to, during the towing, pull at least part of the towed equipment transversely in relation to the direction of movement.

2. Description of the Prior Art

In seismic studies at sea acoustic sources are used being mounted in or close to a vessel, and directing acoustic signals toward the sea floor. Reflections of these signals are received by a number of receivers being positioned in seismic cables being towed behind the vessel. These cables are spread out to a desired width to provide measurements of the geological conditions over an area with a certain width. As the use of the seismic vessel is expensive, it is advantageous to make the width of the tow as large as possible, with a large number of seismic cables, so that one signal pass over the area to be measured covers as large an area as possible. To spread the seismic cables transversely in relation to the seismic vessel deflectors are usually used.

Such deflectors are traditionally passive devices comprising one or more wings providing a lift in the required direction. Because of the towing resistance in the water, caused both by the deflector and the towed cables, there are, however, limits to the lift which may be obtained using passive deflectors, which in turn, together with a wish in seismic studies to keep the seismic cables as close to the vessel as possible, limits how far the deflectors may be pulled transversely. When the deflector is used in seismic surveys it will in addition be loaded with the seismic cable to be pulled sideways. Today there is a limit to the width of the cable tow with passive deflectors being approximately 800 meters, with approximately 10 seismic cables.

Many types of active systems have been suggested in different occasions to obtain a lift, e.g., using the so-called Magnus effect. This means that a rotating cylinder being moved in a medium in a direction perpendicular to its axis will experience a lift. The lift pulls in the direction of movement of the part of the cylinder facing the flow. This effect has been suggested in many applications, such as shown in U.S. Pat. Re 18,122 (Flettner). A disadvantage related to active deflectors is that they are dependent on power supplies. If the power supply fails, the lift is lost. In seismic surveys, a power failure makes it impossible to keep the seismic cables separated, with resulting damages to equipment and cables. Usually the active systems require too much power to allow the power supply to be kept in the deflector. Therefore, the power has to be transmitted from the towing vessel using a cable to the deflector. This cable will in turn increase the towing resistance and thus the power consumption, and also make the system vulnerable to failure in the power supply.

Similar problems also occur if there is a need for different active control systems on board the deflector, for example for adjusting the position of the deflector, the angle in relation to the moving direction and possibly the lifting ability.

SUMMARY OF THE INVENTION

It is an object of the present invention to provide a system increasing the possible width of the seismic surveys. It is also an object of this invention to provide a system being able to supply power to the control systems of the deflector without using long cables between the towing vessel and the deflector. This is obtained using a system as described above and characterized as given in claim 1.

This way the distance in the direction of movement between the vessel and the seismic cables is maintained, at the same time as the width of the surveyed area is larger, e.g., up to 2000 meters with 18 cables.

BRIEF DESCRIPTION OF THE DRAWINGS

The invention is described below with reference to an example shown in the accompanying drawings.

DESCRIPTION OF THE PREFERRED EMBODIMENTS

Figure 1:
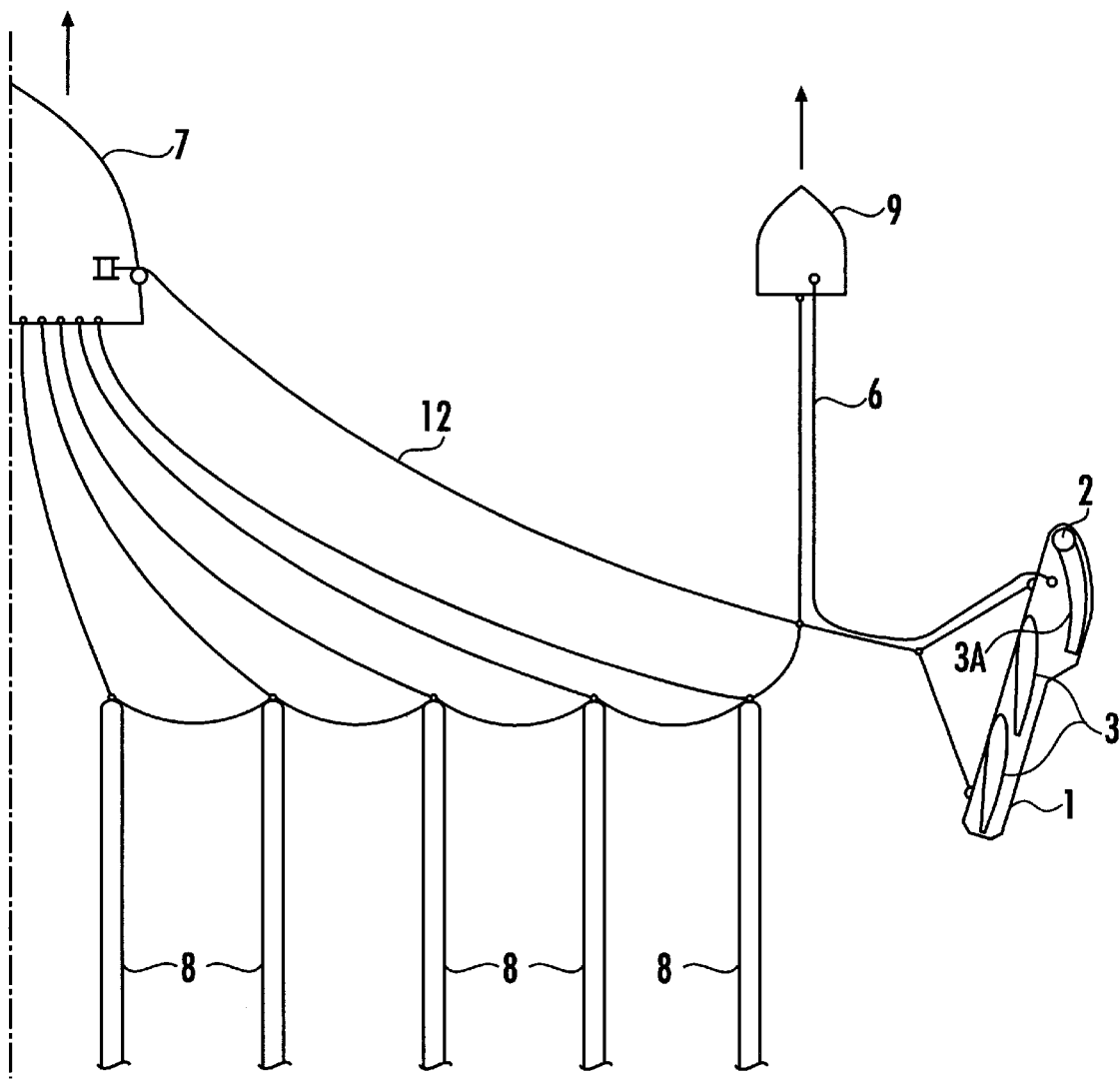
FIG. 1 shows an embodiment of the system according to the invention.

FIG. 1 describes one half of a preferably symmetrical system comprising a towing vessel 7 towing a number of seismic cables 8, which may comprise seismic receivers, or possibly seismic sources. The seismic cables are pulled transversely using a deflector 1, being towed by a towing vessel 7 via a towing wire 12. A support vessel 9 moves in parallel with the towing vessel and is connected to the towing wire 12 by the deflector, so that it possibly may apply an additional towing force to the system. The support vessel is in the drawing connected to the same point on the towing wire 12 from the towing vessel, and thus contributes with towing force in the direction of movement, thus not letting the towing resistance from the seismic cables drag the deflector backward to the same extent.

The support vessel 9 may preferably be remote controlled to control the position in relation to the towing vessel at any time. In the same way, the positions of the deflectors in relation to the towing vessel may be remote controlled via the support vessel and a cable 6 stretching from the support vessel 9 to the deflector 1. The support vessel should, however, be manned to be able to provide maintenance and repairs on board regardless of weather conditions. In seismic surveys the support vessels may also be equipped with seismic sources or receivers to contribute to the data acquisition in the survey.

In the figures, the deflector 1 is an active deflector, and the support vessel comprises a power supply transferring energy to the deflector through the cable 6. The deflector 1 here comprises three wings 3, 3a, of which the first is provided with a rotating cylinder 2 in its front edge, thus exploiting the Magnus effect and providing the deflector with an additional lift outward from the towing vessel. The power supply and the drive unit for the cylinder 2 may be electric or hydraulic, e.g., using water hydraulics. The construction of the couplings between the towing wires, power supplies, deflectors and vessels may comprise any solution and are not relevant to this invention.

The deflector shown in the drawings provides a stable and effective solution, but other embodiments may also be contemplated, with other arrangements of the wings and with a rotating cylinder in the front of one or more of the wings. The cylinder may have a constant diameter along its complete length, or may have another shape, depending on the shape of the associated wing. The shape of the cylinder is adapted to the shape of the wing so that the wing maintains a lifting effect when the cylinder is not rotating, and each cylinder acts as an integrated part of the associated wing. The active deflector may be provided in many different ways, e.g., using propellers or other propulsion systems.

The deflector may also comprise one or more passive wings, possibly with some control or steering functions, or a single wing with a rotating cylinder in its front. This last solution will provide a very effective, but more unstable deflector.

Figure 2:
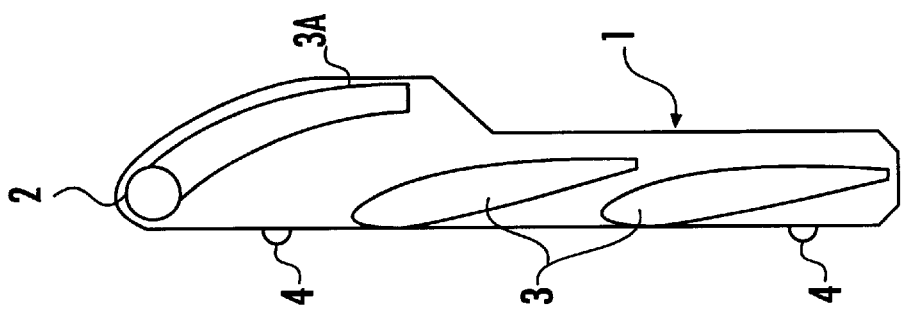
FIG. 2 shows an enlargement of a section of the deflector shown in FIG. 1.

FIG. 2 shows an enlarged view of the deflector in FIG. 1. In addition to the three wings 3, 3a, two connecting points 4 are shown for coupling to the towing wire, and to the towed equipment. Other ways to connect the deflector to the rest of the system may of course also be used, for example a direct connection between the support vessel and the deflector, between the towing vessel and the deflector, and between the deflector and the towed equipment.

Figure 3:
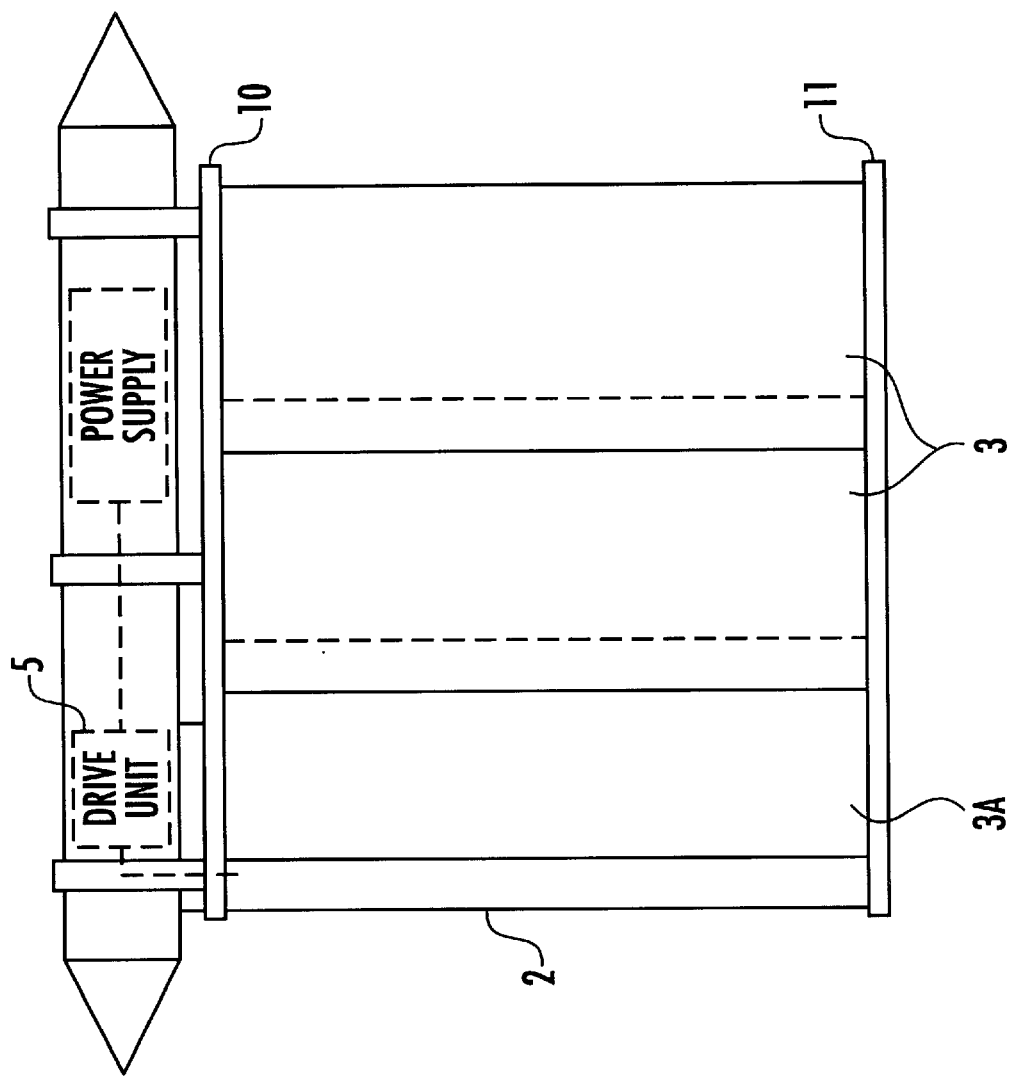
FIG. 3 shows the deflector in FIG. 2, as seen from one side.

FIG. 3 shows the deflector as seen from one side, being equipped with plates 10, 11 on the upper and lower ends connecting the wings 3a, 3 to each other, and also a container 5 on the upper end. The container 5 may contain different control mechanisms, drive units for the cylinders, and, in some cases, power supplies for the cylinders. It may also comprise a buoyancy tank for keeping the deflector in a required position in relation to the surface. The latter may also be obtained using additional wings (not shown) being capable of steering the deflector to a certain depth.

As mentioned above, the drawings show one of many different embodiments of the invention. Even if the shown embodiment with three wings, the first of which being equipped with a cylinder, is the preferred embodiment at the present, other combinations of wings and cylinders may turn out to be better. Simple variations, such as the mounting of the deflector in the system, may of course, with the necessary structural changes and reinforcements, be done within the scope of this invention.

It is also clear that the invention, although here described in relation to seismic surveys, may be used in other types of tows, such as fishing equipment.

What is claimed is:

1. A system for towing equipment at sea, which comprises:
    a main vessel adapted to tow the equipment in a given direction of movement;
    at least one active deflector disposed behind and on each side of the main vessel for pulling at least part of the towed equipment transversely in relation to the direction of movement of the main vessel;
    at least one support vessel connected to each deflector for assisting the deflector in pulling at least part of the towed equipment transversely in relation to the direction of movement of the main vessel and for assisting the main vessel by providing additional towing force to the towed equipment, the additional towing force being essentially parallel in direction to the force provided by the main vessel; and
    a cable connecting each support vessel to the associated active deflector for supplying one or more of power and control signals from the support vessel to the associated deflector.

2. The system of claim 1, wherein the support vessels are remote controlled for controlling their position in relation to the main vessel.

3. The system of claim 1, wherein the position of each deflector in relation to the towing vessel is remote controlled by way of the support vessel and the cable connecting the support vessel to the deflector.

4. The system of claim 1, further comprising:
    at least one wing attached to each deflector, the wing having a front edge and a rear edge;
    a rotatable cylinder attached to the deflector adjacent the front edge of at least one wing; and
    a drive unit associated with the cylinder for rotating the cylinder for imparting to the deflector additional lift outward from the towing vessel.

5. The system of claim 4, wherein the shape of the cylinder conforms to the shape of the front edge of the wing to which it is adjacent, whereby the cylinder acts as an integrated part of the wing, and so that the wing maintains a lifting effect when the cylinder is not rotating.

6. The system of claim 4, wherein the drive unit is an electric motor.

7. The system of claim 4, wherein the drive unit is a hydraulic motor.

8. The system of claim 4, further including a power supply for powering the drive unit, and wherein the towed equipment and the power supply are connected directly to the deflector.

9. The system of claim 4, wherein the deflector includes two or more wings, one of which wings is disposed near the front of the deflector, the rotatable cylinder being attached to the deflector adjacent the front edge of the frontmost wing.

10. The system of claim 9, wherein the deflector includes three wings, the rotatable cylinder being attached to the deflector adjacent the front edge of only the frontmost wing.

11. The system of claim 10, wherein the wings have upper and lower ends attached to upper and lower plates, respectively, on the deflector for securing the wings to the deflector and in spaced relationship to one another.

12. The system of claim 10, wherein the deflector has upper and lower ends, and further including a container disposed at the upper end of the deflector for containing one or more of the drive unit for the rotatable cylinder, a power supply, and a control mechanism for the deflector.

13. The system of claim 12, wherein the container comprises a buoyancy tank for keeping the deflector in a desired position in relation to the water surface.

14. A system for towing equipment at sea, which comprises:
    a main vessel adapted to tow the equipment in a given direction of movement;
    at least one active deflector disposed behind and on the side of the main vessel for pulling at least part of the towed equipment transversely in relation to the direction of movement of the main vessel;
    at least one wing attached to each deflector, the wing having a front edge and a rear edge;

a rotatable cylinder attached to the deflector adjacent the front edge of at least one wing, the cylinder conforming in shape to the front edge of the wing, whereby the cylinder acts as an integrated part of the wing, and so that the wing maintains a lifting effect when the cylinder is not rotating;

a drive unit associated with the cylinder for rotating the cylinder for imparting to the deflector additional lift outward from the towing vessel; and at least one support vessel connected to each deflector for assisting the deflector in pulling at least part of the towed equipment transversely in relation to the direction of movement of the main vessel.

15. The system of claim 14, wherein the deflector includes three wings, one of which is disposed near the front of the deflector, the rotatable cylinder being attached to the deflector adjacent the front edge of the frontmost wing.

16. The system of claim 14, further including a cable connecting each support vessel to the associated deflector for supplying one or more of power and control signals from the support vessel to the associated active deflector.

17. The system of claim 14, further including a power supply for powering the drive unit, and wherein the towed equipment and the power supply are connected directly to the deflector.

18. The system of claim 14, wherein the position of each deflector in relation to the towing vessel is remote controlled by way of the support vessel and the cable connecting the support vessel to the deflector.

19. The system of claim 14, wherein the deflector has upper and lower ends, and further including a container disposed at the upper end of the deflector for containing one or more of the drive unit for the rotatable cylinder, a power supply, and a control mechanism for the deflector.

* * * * *